March 13, 1956  F. R. BOWEN ET AL  2,737,866
AGRICULTURAL IMPLEMENT

Filed June 21, 1954  2 Sheets-Sheet 1

FLOYD R. BOWEN
WILLIAM J. DICKERSON
INVENTORS

HUEBNER, BEEHLER,
WORREL & HERZIG
ATTORNEYS
BY

March 13, 1956  F. R. BOWEN ET AL  2,737,866
AGRICULTURAL IMPLEMENT
Filed June 21, 1954  2 Sheets-Sheet 2
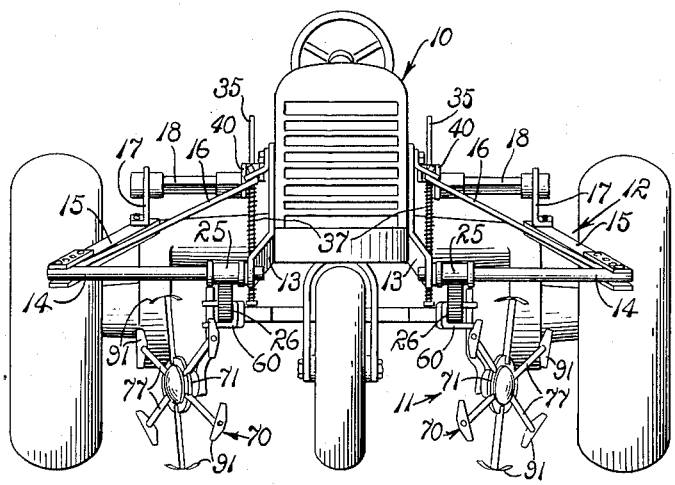
Fig. 3.
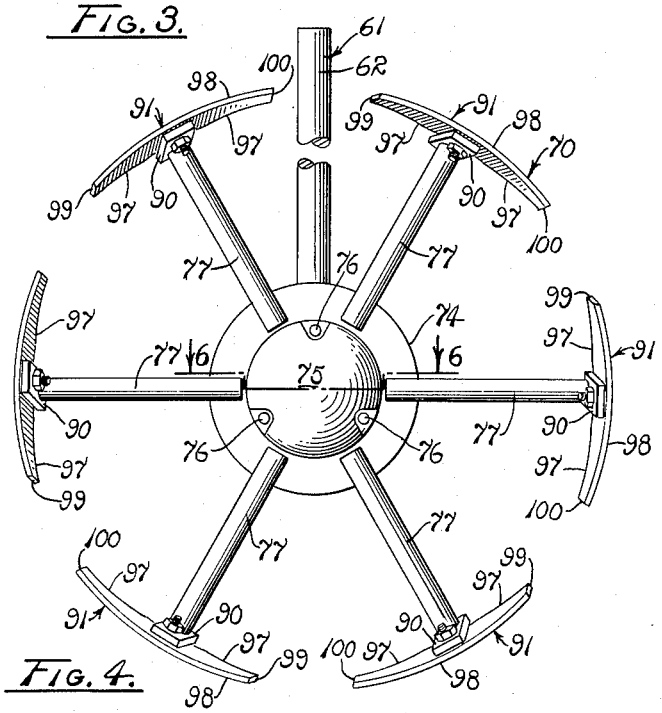
Fig. 4.
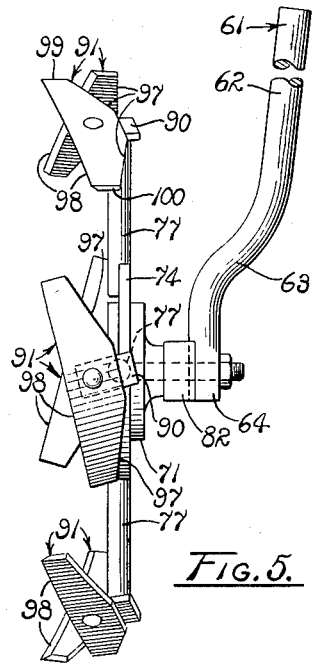
Fig. 5.
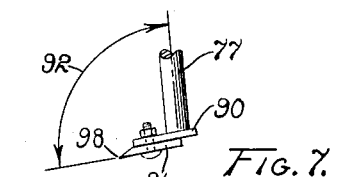
Fig. 7.
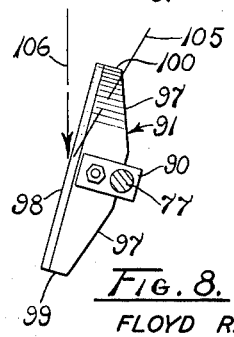
Fig. 8.
Fig. 6.
FLOYD R. BOWEN
WILLIAM J. DICKERSON
INVENTORS
HUEBNER, BEEHLER, WORREL & HERZIG
ATTORNEYS
BY Richard M. Worrel

United States Patent Office 2,737,866
Patented Mar. 13, 1956

2,737,866

AGRICULTURAL IMPLEMENT

Floyd R. Bowen and William J. Dickerson, Bakersfield, Calif.

Application June 21, 1954, Serial No. 437,957

6 Claims. (Cl. 97—22)

The present invention relates to agricultural implements and more particularly to an earth working implement adapted for chopping, cutting, thinning, weeding or otherwise cultivating the soil in or around crops planted therein or prior to such planting at periodic intervals in earth traversing movement.

The necessity of cultivating row crops to effect a thinning or weeding thereof is well-known. Mechanized implements for accomplishing this result particularly in the cultivation of cotton are known as choppers and in the past have assumed a variety of forms.

One such form of cotton chopper comprises a wheel rotatably mounted in a frame with its axis in alignment with the direction of movement of the frame which has chopping tools or hoe simulating members mounted in radially disposed positions thereon. Such wheels are power driven by any suitable means and rotate to present the tools successively to the soil to effect a hoeing action.

For several reasons, these implements have not accomplished their intended purpose in a completely satisfactory manner. Conventional choppers tend to collect and retain soil and other debris on the chopping tools thus decreasing the chopping efficiency after traversing one or more rows. Further, they knock down, mangle or otherwise brush against growing plants in a destructive manner. More significantly, however, they fail to simulate effectively the chopping action which would be realized by the manual utilization of a hoe. These problems are effectively solved by the present invention which is designed, among other objects, to provide a motion for a chopping tool mounted generally in the above described manner which closely simulates a manual hoeing action and which makes the most efficient and effective use of the chopping tool.

Another object is to improve the action of cultivating tools adapted for use in chopping, cutting, thinning, weeding or hoeing row crops or the soil therearound.

Another object is to provide a ground driven implement of the character described.

Another object is to provide a cultivator of the chopping wheel type which is arranged more effectively to utilize the chopping tools thereon.

Another object is to provide a mounting arrangement for a cultivator of the rotary chopping wheel type which enables a more effective soil digging action.

Another object is to provide a rotary chopping tool for use in cultivating row crops which is adapted closely to simulate a manual hoeing action.

Another object is to provide a structure in accordance with the foregoing objects which is mounted in such a manner as to accommodate uneven terrain, shake off soil and debris collected thereon and which minimizes mangling or other destruction of plants by brushing thereagainst.

Another object is to provide an agricultural implement for the cultivation of row crops which is conveniently adjustable, simple and economical to construct, which is readily adapted for attachment directly to a prime mover, or for construction in separate units, and which is adapted for ganged arrangement to work multiple rows.

These and other objects will become more fully apparent upon reference to the following description.

In the drawings:

Fig. 3 is a front elevation of the arrangement shown in Fig. 1.

Fig. 4 is a somewhat enlarged axial view of a chopping wheel constructed in accordance with the principles of the instant invention.

Fig. 5 is a peripheral view of the chopping wheel shown in Fig. 4.

Fig. 6 is a fragmentary section of the hub of the chopping wheel shown in Fig. 4, taken on line 6—6 thereof.

Fig. 7 is an end elevation of one of the chopping blades of the chopping wheel of Fig. 4 illustrating a mounting structure therefore and its angle of inclination during the initiation of a chopping stroke.

Fig. 8 is a plan view of one of the chopping blades of the chopping wheel, showing a mounting arm thereof in section.

Figure 1:
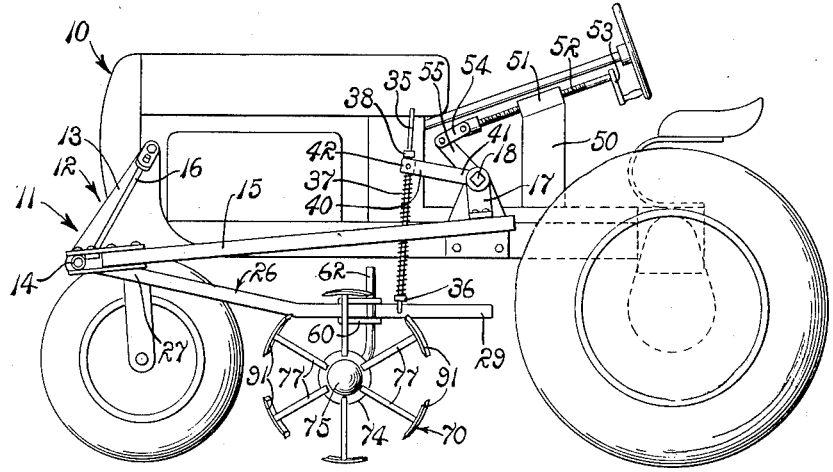
Fig. 1 is a side elevation of a tractor having mounted thereon an implement embodying the principles of the present invention.

Referring in greater detail to the drawings:

A tractor 10 or other convenient prime mover having an implement, generally denoted by the numeral 11, attached thereto is shown in Fig. 1.

The implement 11, constructed in accordance with the principles of this invention, provides a frame 12 mounted on the tractor 10. This frame includes a pair of brackets 13 attached forwardly on each side of the tractor and in downward extension therefrom. Because the frame arrangement is identical on each side of the tractor, only the right side, as viewed in Fig. 2, will be considered in the following description.

Mounting bracket 13 supports an axle 14 in the downwardly extended portion thereof, the axle extending outwardly from the tractor in a substantially horizontal position. A bar 15 is connected at the outer end of the axle and extends rearwardly therefrom. A brace 16 is connected between the bracket 13 and the forward end of the bar. A bracket 17 is mounted at the rearward end of brace 16 and provides an upwardly extended bearing for the reception of a shaft 18 therein. The shaft preferably extends transversely of the tractor in substantially parallel relation of the axle 14, being journalled in a similar bracket 17 on the other side of the tractor.

A bearing sleeve 25 is rotatably journalled on the axle 14. A mounting arm 26 having a forward portion 27, an offset portion 28 and a rearward portion 29 is connected at its forward portion to the bearing sleeve. The mounting arm extends rearwardly of the axle 14 between the bar 15 and the side of the tractor and is adapted for vertical pivoting movement around the axle 14.

Figure 2:
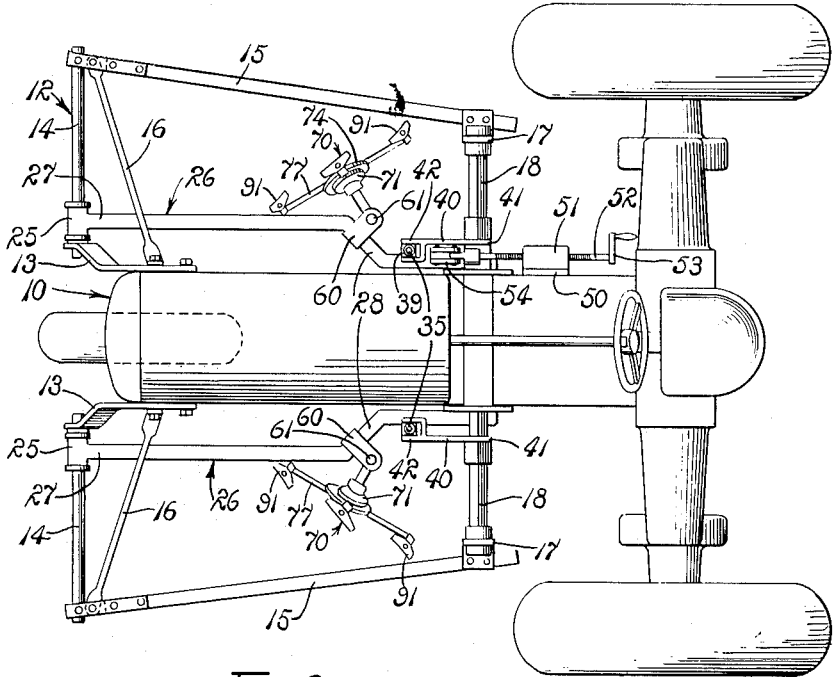
Fig. 2 is a top view of the structure shown in Fig. 1.

A control rod 35 mounted in a substantially vertical position is pivotally connected at its lower end to the rearward portion 29 of the mounting arm 26. The control rod provides a lower collar 36, a compression spring 37 received on the rod and bearing at one end against the collar and an adjustable upper collar 38. A block 39 is slidably mounted on the control rod and bears against the upper end of the spring. The upward movement of the block is limited by the adjustment of the upper collar. A control arm 40 provides a rearward end 41 rigidly connected to shaft 18 and a forward bifurcated end 42 for reception of a block 39 therebetween, as best seen in Fig. 2.

An upwardly extending bracket 50 is mounted on the tractor 10 or otherwise connected to the frame rearwardly adjacent to the shaft 18 and provides at its upper end a downwardly inclined threaded sleeve 51. An elongated screw 52 is threadably received in the sleeve having a control handle 53 at its rearward end and being pivotally connected to a pair of linkages 54 and 55 at its forward end. The linkage 55 at one of its ends is rigidly secured to the shaft 18. It will be apparent that rotation of handle 53 is effective to increase or decrease the compression of spring 37 thereby increasing or decreasing the pressure on the mounting arm 26. Further, retraction of screw 52 a sufficient amount enables lifing of both mounting arms 26 due to the abutment of control arm 40 against upper collar 38.

A bracket 60 is mounted on the offset portion 28 of the mounting arm 26. A mounting shank 61 has an upper end 62 slidably adjustably fitted in the bracket 60. The mounting shank further is provided with an offset portion 63 and a mounting end portion 64 providing an opening 65 therein. The upper end and mounting end portions of the mounting shank do not lie in parallel planes but are in preferably planes at least of slight angular relation to each other for reasons soon to become apparent.

A rotary chopping wheel, generally denoted by the numeral 70, is adapted to be mounted on the mounting shank 61. The chopping wheel includes a hub 71, best shown in Fig. 6, providing a bore 72 with forward and rearward frusto-conical recesses, as 73, therein. An annular plate 74 is mounted on the hub and an outwardly dished cover plate 75 is fitted against the annular plate. A plurality of bolts, as 76, extend through the cover plate, annular plate and hub holding these members in assembly. A plurality of spokes 77 are mounted, as by welding, in radially extended substantially equal angular positions on the annular plate 74.

A spacer 80 is placed in the bore 72 of the plate 74 and a pair of cone bearings 81 are fitted into the frusto-conical recesses 73 at each end of the bore in abutment against the spacer. A cylindrical sealing member 82 is fitted over the rearward side of the annular plate and provides a seat fitted on the mounting end 64 of the shank 61. A bolt 83 connects the plate, sealing member and mounting shank together and a nut 84 is threadably fitted on the bolt. It will be apparent that this arrangement provides for rotation of the chopping wheel around the bolt 83 as an axis with the cones 81 acting as a bearing surface for the hub 71.

Considering now the specific mounting of the chopping tools, reference is made in particular to Figs. 5 to 8. Therein, it will be noted that each of the spokes 77 provides a carrying member 90 mounted at the outer end thereof, as by welding. A blade 91 is connected to the carrying member by a bolt 94 or some other suitable means. The blades are of fractional cylindrical form and preferably have a curvature of a radius substantially equal to their spacing from the center of the bolt 83. The carrying member is mounted on the spoke associated therewith at an obtuse angle, generally indicated at 92, thus mounting the blades 91 at a similar angle. The blades extend in divergent relation outwardly from the plane of the chopping wheel, as best seen in Fig. 5.

Each of the blades 91 is provided with tapered rear edges 97, a forward knife edge 98, a leading edge 99 and a trailing edge 100. Each blade is connected to its carrying member 90 so that its knife edge 98 lies in a vertical plane interposed the plane of the chopping wheel, indicated at 105 in Fig. 8, that is the plane defined by radially extending spokes 77, and a vertical plane indicated at 106, aligned with the direction of travel of the tractor 10 when the blade is in a downwardly dependent earth engaging position.

The chopping wheel 70 is mounted in the frame with the upper end 62 of mounting shank 61 adjusted until the plane of the wheel is oblique to the frame 12 and to the direction of earth traversing movement thereof during operation. The angular disposition of each wheel may be varied to suit operational conditions and requirements. It will be noted that the chopping wheels 70 are rearwardly divergent as shown in Fig. 2. This suitably illustrates the invention but it should be borne in mind that the present invention is not limited to such an arrangement. If desired, the wheels can equally as well be constructed and mounted to chop inwardly instead of outwardly. However, there are two relationships worthy of particular note. The angularity of the wheels 70 relative to the direction of earth traversing movement gives the arms a lateral component of movement as the wheels rotate in earth engagement so that the blades 91 are caused to chop transversely of rows along which the tractor is driven. Further, the forward tipping of the upper portions of the chopping wheels gives markedly improved chopping action to the blades.

Operation

From the foregoing, the operation of this invention is believed to be readily apparent and is briefly summarized at this point. The tractor 10 carrying the implement 11, as described above, is driven onto a field wherein it is desired to thin, weed or similarly cultivate a cotton or other row crop of yet unplanted field. The tractor is driven so as to straddle the rows and in such a manner that the chopping wheels 70 at each side thereof are disposed upwardly adjacent to the hills or rows. By rotating the handle 53 the arms 26 and thereby the chopping wheel 70 are lowered into position so that the then lower blades 91 are in digging relation to the soil.

As the tractor moves forwardly, the blades 91 successively engage the earth and a counterclockwise turning motion, as seen in Fig. 1, is imparted to the wheels 70. Although automatic rotating means could be employed to turn the wheels, the drive obtained by earth engagement has been found very effective in practice. Of course, well lubricated bearing elements as well as dirt and dust protected bearings, such as shown in Fig. 6, are conducive to proper rotation of the wheels when earth driven.

The leading edge 99 of each blade enters the side of a row with a downward sweeping action. The oblique orientation of each wheel 70, the forward inclination of axis 65, the angular offset of each blade 91 and the outward divergence of the blades relative to the plane of the wheel are all features designed to position more accurately the cutting edge 98 when it sweeps through the hill or row of soil to utilize the cutting edge in the most effective manner. This arrangement provides an action closely simulating that of manual hoeing. That is, an entry of the hoeing blade in a downward sweeping arc along the side of the row and, as in the present invention, with the cutting edge of the hoe, like edge 98, pulled rearwardly through the soil at an angle lying between the longitudinal direction of the row and a direction transverse thereto. With the wheels and blades so oriented, they minimize brushing against growing plants thereby reducing crop-plant damage to a substantial degree. Even when used in a thinning operation it severs the plants to be thinned around the submerged roots, leaving the tops untouched and thus unentangled. Further, dirt, plants, weeds and other debris collected on the blades more readily fall therefrom as the blades leave the soil due to the downward inclination of the wheel and blades. Again, due to the positioning of the blades and their forward and rearward tapered ends 99 and 100, they enter and pass through the soil smoothly, readily sliding past stones, rocks and other obstructions, thus minimizing breakage and bending of the blades. The wheels are held into earth engagement and readily accommodate themselves to uneven and rough terrain by the spring pressed mounting provided by central rods 35 and springs 37.

Although the foregoing description provides an implement 11 which is directly attached to the prime mover 10, the invention is not to be so limited. The principles of this invention can equally as well be applied to a draft frame incorporating the features of this invention and ground supported independently of the reactor. Further, the number of chopping wheels can be increased or decreased on either or both sides of the frame depending upon the number of rows desired to be cultivated. Also the number and spacing of chopping blades may be varied as a particular application may suggest. As noted above, the various angular relationships of wheel 70 and blades 91 may be changed depending on the particular application of the implement. Thus, it will be apparent from the foregoing that a highly effective and adaptable cultivating implement which lends itself to economical use has been provided.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An agricultural implement comprising a frame adapted for connection to a prime mover having a predetermined direction of movement, a plurality of arms mounted in the frame for elevational pivoting action about a substantially horizontal axis, wheels rotatably mounted on each of the arms in planes angularly related to the predetermined direction of movement, each having a plurality of peripheral earth engaging arcuate blades extended from the plane of their respective wheel and concentrically thereof, each of the blades having a chopping edge angularly disposed to the direction of movement of the prime mover at an angle less than the angle of its wheel relative to said direction of movement when its respective blade is at its lowermost point during wheel rotation, and means connected to the arms resiliently urging the blades into earth engagement.

2. In an implement comprising a support frame having a predetermined direction of earth traversing movement, an earth engaging chopping wheel arranged in a substantially erect plane obliquely related to the predetermined direction of movement and including a hub rotatably mounted in the frame, a plurality of spokes connected to the hub having ends radially extended therefrom, and chopping blades individually attached to the ends of the spokes extended outwardly from the plane of the wheel, each blade having a knife edge disposed at an angle to the direction of earth traversing movement less than the angle of the wheel relative to said direction of movement when its blade is in earth engagement during wheel rotation.

3. An implement comprising a support frame having a predetermined direction of earth traversing movement, an earth engaging chopping wheel arranged in a substantially erect plane obliquely related to the predetermind direction of movement and including a hub rotatably mounted in the frame, a plurality of spokes connected to the hub having ends radially extended therefrom, chopping blades individually attached to the ends of the spokes for successive earth engagement incident to wheel rotation and extended outwardly from the plane of the wheel at an obtuse angle relative to the plane of the wheel whereby each blade is rearwardly inclined relative to the direction of earth traversing movement when in earth engagement, each blade having a knife edge angularly related to the direction of earth traversing movement at an angle less than the angular relation of the wheel thereto when in earth engagement, and means resiliently urging the chopping wheel into earth engagement yieldable to permit vertical movement of the wheel in accordance with the contour of the earth.

4. An agricultural implement adapted for earth traversing movement in a predetermined direction comprising support means, a chopping wheel freely rotatably mounted in the support means having an axis of rotation angularly displaced in downward inclination from a horizontal plane and obliquely related to the predetermined direction of movement of the implement, the wheel having a hub, a plurality of spokes radially extended from the hub, and chopping blades individually attached at outer ends of the spokes for successive earth engagement during earth traversing movement, the chopping blades being extended forwardly from the wheel in transversely forwardly diverging relation whereby each blade when in earth engagement is transversely rearwardly inclined, each blade having a forwardly disposed knife edge angularly related to the direction of earth traversing movement at an angle when in earth engagement less than the angular relation of the wheel relative to said direction of movement, and means resiliently urging the chopping wheel into earth engagement yieldable to permit floating movement of the wheel in response to movement over uneven terrain.

5. In an agricultural implement, a rotary chopping wheel having a hub, spokes radiating from the hub, and arcuate blades having cutting edges mounted on the spokes concentrically of the hub, and means mounting the hub for free rotation of the wheel and earth traversing movement along a line of travel oblique to the wheel with the blades in successive earth engagement whereby rotary motion is imparted to the wheel, the blades being mounted on the spokes with the cutting edges thereof disposed generally forwardly of the line of travel and angularly relative to the line of travel at a more acute angle than the angular disposition of the wheel to said line of travel whereby a slicing action is imparted to the cutting edges.

6. In an agricultural implement, a rotary chopping wheel having a hub, spokes radiating from the hub, and arcuate blades mounted on the spokes concentrically of the hub, each being of a radius of curvature substantially equal to their spacing from the hub; means engaged with the hub mounting the wheel for rotation about an approximately horizontal slightly forwardly declined axis and for earth traversing movement oblique to said axis whereby the wheel has a forward side and a rearward side and with the wheel in rolling earth engagement whereby successive blades are brought into earth engagement, the blades being mounted on their respective spokes with their cutting edges when in earth engagement angularly related to the line of travel oppositely and more acutely than the angular relation of the axis of rotation relative to said line of travel and with the blades transversely rearwardly inclined relative to the line of travel when in earth engagement.

References Cited in the file of this patent

UNITED STATES PATENTS

| Number | Name | Date |
|---|---|---|
| 950,836 | Brunnell | Mar. 1, 1910 |
| 2,137,233 | Brotzman | Nov. 22, 1938 |
| 2,528,897 | Mayfield | Nov. 7, 1950 |
| 2,660,939 | Pool et al. | Dec. 1, 1953 |